United States Patent

[11] 3,616,063

[72] Inventor Richard C. Bradley
c/o Plastic Engineering & Chemical Co.,
3501 N.W. 9th Ave., Fort Lauderdale, Fla.
33315
[21] Appl. No. 723,011
[22] Filed Apr. 22, 1968
[45] Patented Oct. 26, 1971
Continuation-in-part of application Ser. No. 331,549, Dec. 18, 1963, now Patent No. 3,379,591, dated Apr. 23, 1968, which is a continuation-in-part of application Ser. No. 118,912, June 22, 1961, now abandoned.

[54] TUBULAR ARTICLES AND APPARATUS FOR FORMING THE SAME
15 Claims, 17 Drawing Figs.
[52] U.S. Cl. .................................................. 156/425, 156/429
[51] Int. Cl. ........................................... B31c 13/00, B31c 1/08, B31c 3/00
[50] Field of Search ............................................. 156/425, 426, 429

[56] References Cited
UNITED STATES PATENTS

| | | | |
|---|---|---|---|
| 1,719,738 | 7/1929 | Wayne ........................ | 156/425 |
| 1,736,911 | 11/1929 | Gray ............................ | 156/425 |
| 1,876,760 | 9/1932 | Rosener ...................... | 156/425 |
| 1,979,656 | 11/1934 | Whitman ..................... | 156/425 X |
| 2,812,007 | 11/1957 | Touchett et al .............. | 156/429 |
| 3,401,073 | 9/1968 | Wood .......................... | 156/429 |

Primary Examiner—Benjamin A. Borchelt
Assistant Examiner—Thomas H. Webb
Attorney—Rommel & Rommel

ABSTRACT: Apparatus for making pipe and the like of synthetic resins and which may include reinforcing materials comprising cut lengths of roving and filament strands by depositing the same on a mandrel of suitable size and shape, which apparatus may include mandrel drive means, heating and cooling means for the mandrel, means for depositing the material to be molded upon the mandrel, strand-tensioning means, strand carriage drive means, and means for compacting the material deposited upon the mandrel.

Fig. 1.

TUBULAR ARTICLES AND APPARATUS FOR FORMING THE SAME

This application is a continuation-in-part of my copending application Ser. No. 331,549, filed Dec. 18, 1963, entitled "FILAMENT WINDING OF TUBULAR ARTICLES WITH INCORPORATION OF CUT LENGTHS OF ROVING DURING WINDING," now U.S. Pat. No. 3,379,591, dated Apr. 23, 1968, which was, in turn, a continuation-in-part of my application Ser. No. 118,912, filed June 22, 1961, entitled "APPARATUS AND METHOD FOR FORMING TUBULAR ARTICLES," now abandoned.

This invention relates to improvements in tubular articles and apparatus for forming the same.

The formation of articles by the spray depositing of plastic compositions, such as alkyd polyester and epoxy types of resins, wherein a promoted resin, catalyzed resin, and in selected instances, aggregates or glass roving, are simultaneously deposited upon a form has heretofore only been practical when the articles to be formed are of an open construction, such as chairs, seats, tables, etc., or for the overcoating of items of an open construction such as wooden boats, swimming pools, etc. The primary object of this invention is the provision of apparatus whereby tubular articles, such as pipe and the like, may be formed by the spray depositing of plastic compositions.

A further object is the provision of apparatus for the forming of tubular articles, such as pipe and the like, by the spray depositing of plastic compositions, such apparatus having a novel mandrel and including a cooperative drive relationship between the mandrel and depositing gun.

A further object is the provision of apparatus for the removal of air bubbles and compacting and arranging of a spray deposited plastic composition.

A further object is the provision of improved strand-tensioning means whereby when a filament wound tubular article is to be provided, the strands of the filament will be maintained under proper tension.

A further object is the provision of improved tubular articles of plastic composition.

A further object is the provision of approved apparatus for the continuous manufacture of tubular articles according to the invention.

Other objects and advantages of the invention will be apparent during the course of the following detailed description, taken in connection with the accompanying drawings, forming a portion of this specification, and in which drawings:

Figure 13:
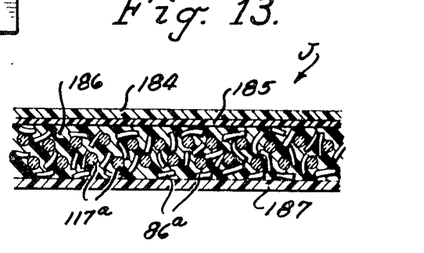
FIG. 13 is an enlarged sectional view of a tubular article, taken substantially on the line 13—13 of FIG. 12.
Figure 14:
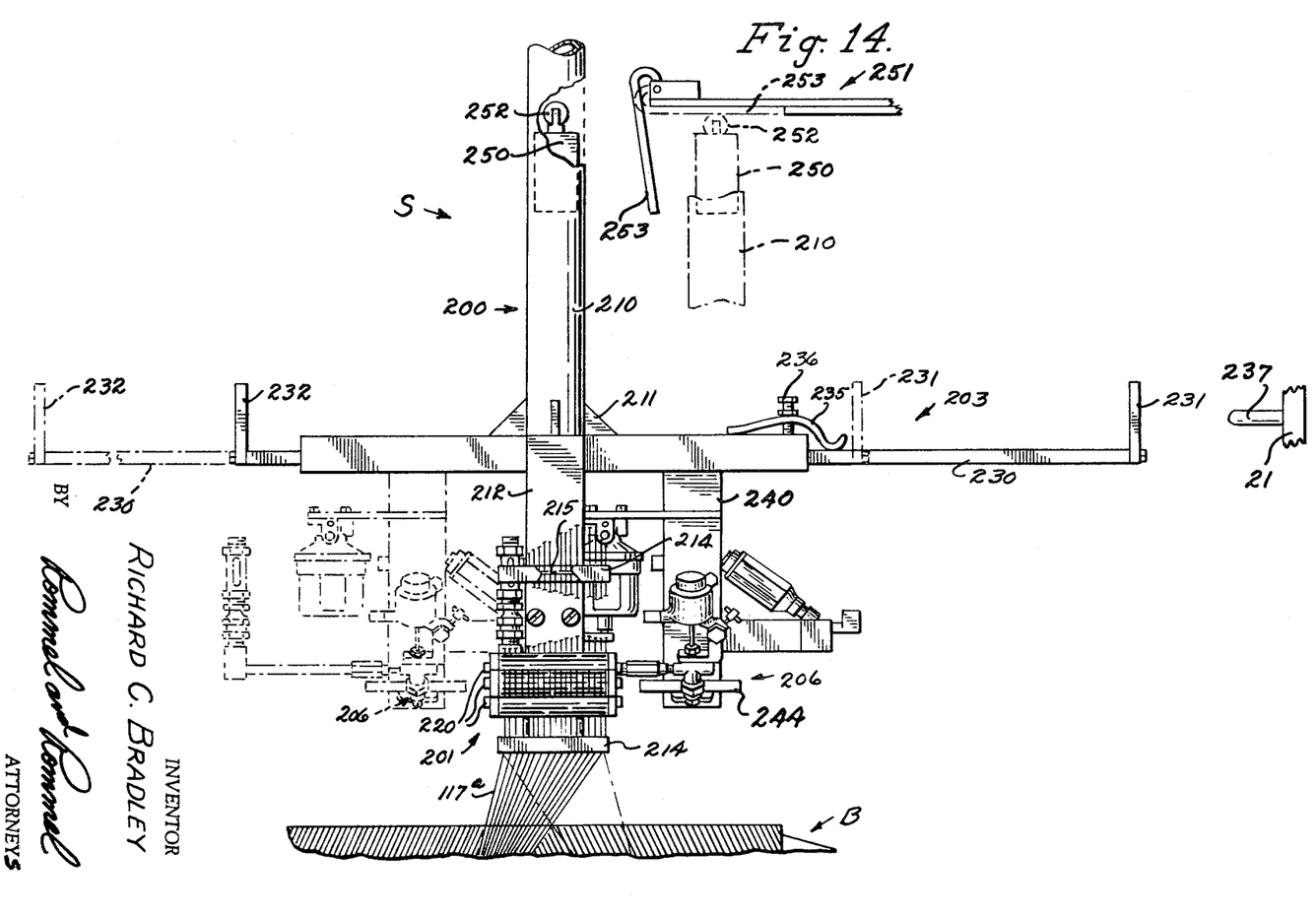
FIG. 14 is a front view of a modified form of apparatus.
Figures 15, 16:
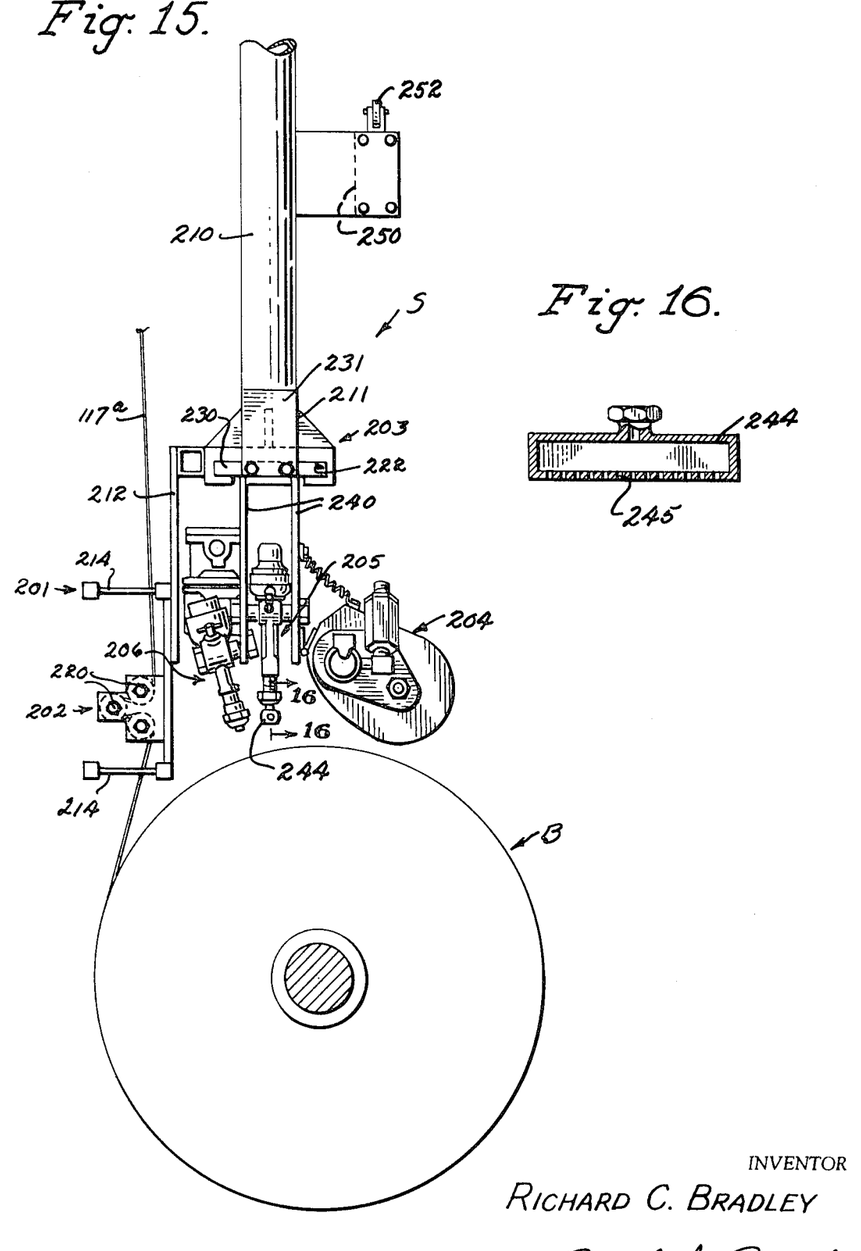
FIG. 15 is a view looking from the left-hand side of the modified apparatus of FIG. 14.
FIG. 16 is a view substantially along line 16—16 of FIG. 15.

In the drawings, wherein for the purpose of illustration to show a preferred and modified embodiments of the invention, and wherein similar reference characters designate corresponding parts throughout the several views, the letter R may generally designate the embodiment of the invention as shown in FIGS. 1–13, which may include a frame A, mandrel B, mandrel drive means C and heating and cooling means D, means E for depositing the material to be molded upon the mandrel B, strand tensioning means F, strand carriage drive means H, means I for compacting the material deposited upon mandrel B, and an improved article J which may be formed thereby; S the modified form of invention as shown in FIGS. 14 and 15; and T the schematic arrangement as shown in FIG. 16. The frame A is preferably of a skeletal nature, including a base 20, vertically extending side portions 21; a mandrel-supporting portion 22; and track-supporting portion 24. The frame is preferably compactly constructed so that it may be mounted on a vehicle, for field operation thereof.

In the drawings, the mandrel supporting portion 22 has been shown closer to the base portion 20 than it would be in actual practice, the same being so arranged so that the apparatus may be conveniently illustrated in the relatively small space provided on each sheet of drawing. In actual practice, the mandrel supporting portion 22 would preferably be spaced apart from the base portion 20 a sufficient distance to place the mandrel B at a convenient height for the operator of the apparatus.

The mandrel B preferably includes a main cylindrical body portion 30 having a portion 31 thereof which is of smaller outer diameter than the remainder, and including end portions 33 and 34. The portions 30, 31, 33 and 34, define chamber 35. The end walls 33 and 34 are respectively provided with ports 36 and 37 to which are respectively connected conduits 39 and 40. The conduits 39 and 40 extend axially of the mandrel B, and provide axles about which the mandrel B may be rotated.

Portion 31 of the mandrel B is provided with a fillet sleeve 43, fillet sleeve 43 extending along the portion 31 and having an outer diameter the same as that of the body portion 30. The fillet sleeve 43 is removably secured to the mandrel B such as by screws 44.

To the end of body portion 30 opposite the portion 31, is mounted a sleeve 46, the sleeve 46 extending along the body portion 30 and providing an enlarged outer diameter at one end of the mandrel B, for a purpose which will be subsequently described. The sleeve 46 is removably secured to the mandrel B, such as by screws 48.

The mandrel B is preferably of some material which is readily expansible and contractable by the application of heat or cold thereto, such as aluminum. This is important to my invention, inasmuch as the mandrel B will be heated by the application of a heated fluid through the tubes 39 and 40 during the spray-depositing operation, the fluid being injected into the chamber 35 through one of the conduits, and thence passing through the chamber 35 and out through the other of the conduits, the heat from the fluid expanding the mandrel B. The heat of the mandrel B will likewise aid in the curing of the plastic compositions spray deposited upon the mandrel B. After the desired thickness of the plastic composition has been spray deposited upon the mandrel B, a cold fluid will be circulated through the chamber 35, causing the mandrel B to contact, so that the plastic article formed thereupon may be removed from the contracted mandrel.

It is, of course, within the scope of my invention to substitute other types of expansible and contractable mandrels for that shown and described. For instance, a segmental cylinder might be utilized, which could be merely retracted or knocked down after the tubular article had been formed thereupon. Expansible and contractable mandrels of this type are well known in the art.

Suitable bearing means 49 may be provided for rotatably supporting the conduits 39 and 40. Such bearing means may be conventional pillow blocks, or might be some form of quick release bearing, such as that shown in the drawings, so that the mandrel may be readily removed from the apparatus. The bearing means shown in the drawings preferably includes a U-shaped base portion 50 having a bushing portion 50$^a$ and a cover portion 51 having a bushing portion 51$^a$. This construction is provided so that the mandrel may be used until the tubular article formed thereupon has been completed, whereupon the cover portion 51 of bearing means 49 would be raised and the mandrel lifted from base portion 50 for further treatment of the tubular article and removal from the mandrel at another station, and a new mandrel put in place for the making of another tubular article.

Mounted upon the conduit 40 may be a gear 52, which gear 52 cooperates with the mandrel drive C for powered rotation of the mandrel B, as will be subsequently described.

Mounted upon the conduit 39 may be a bracket 53 which supports an air inflated tire 54, the tire 54 cooperating with the compacting and arranging means I, as will be subsequently described. Suitable spacer plates 55 may be mounted upon the conduits 39 and 40 for correctly positioning the mandrel B intermediate the bearing means 49.

Mandrel drive means C preferably includes a motor 56 mounted upon the frame A, which motor 56 has a drive shaft 57 upon which is mounted a gear 58 which intermeshes with and drives the gear 52 mounted on the conduit 40. The motor 56 is preferably hydraulically operated, so that it may be driven in direct relationship to the drive of the carriage drive means H, as will be subsequently described.

Mandrel heating and cooling means D preferably include a conduit 60 secured to the conduit 39, which conduit 60 leads to a heater 62, which heater 62 is interconnected to blower 63, a conduit 64 leading from blower 63 to the conduit 40. The form of invention herein shown and described is for the heating and cooling of the mandrel B by air, although it is to be understood that it is not necessarily limited to air heating and cooling, but that other fluids, such as water, may be utilized. In the heating operation, the heater 62 is activated, the blower 63 is started, and air is continuously circulated from the blower 63 through conduit 64, through conduit 40, through the mandrel B, through conduit 39, through conduit 60, through heater 62, and back to the blower 63. A closed heating circuit is thereby provided. When the cooling operation is to be performed, the heater 62 may be disconnected from the blower, in which case air at room temperature may be picked up by the blower 63 and circulated through the mandrel B. In the event that the temperature of the air surrounding the apparatus is too high to provide the desired cooling of the mandrel B a refrigeration unit may be interconnected thereto for providing refrigerated air for circulation through the mandrel B.

Means E for the spray depositing of plastic compositions may be similar to that disclosed in my U.S. Pat. No. 3,123,307, dated Mar. 3, 1964, the same including a gun 69 having nozzles 70 and 71, which nozzles 70 and 71 are angled so that the streams emitted therefrom will intersect and be intermixed prior to impinging upon the mandrel B. Rather than the trigger-operated guns as disclosed in the aforementioned U.S. Pat. No. 3,123,307, dated Mar. 3, 1964, the guns shown in the drawings are air operated, the air operation of such guns being well known in the trade. Suitable conduits 73 and 74 lead respectively to the nozzles 70 and 71, for injecting a promoted resin through one of the nozzles, and a catalyzed resin through the other of the nozzles. An airhose 77 is provided, having a terminal portion 78 leading to one of the nozzles, and a terminal portion 79 leading to the other of the nozzles. The gun 69 preferably includes a body portion 82, upon which are mounted the nozzles 70 and 71. A shaft 83 is secured to the body portion 82, the shaft 83 extending through a sleeve 84 mounted upon the carriage-supporting portion 24 of the frame A. The shaft 83 is slidably mounted through the sleeve 84, so that the spray depositing means B may be positioned in a desired spaced-apart relationship from the mandrel B. Setscrews 85 may be provided upon the sleeve 84 for fixing the shaft 83 at a desired spaced apart position from mandrel B.

Also mounted upon the body portion 82 is a cutter 86 for supplying cut lengths of glass roving 86$^a$ into the spray stream emitting from the nozzles 70 and 71, so that a resin-glass plastic composition may be sprayed deposited upon the mandrel B. The cutter 86 is driven by an air motor 87 to which leads a conduit 88 from the main air conduit 77. The gun itself forms no part of the present invention, it being understood that any suitable form of apparatus for spray depositing suitable compositions upon the mandrel B may be substituted for the gun shown and described.

Strand tension means F preferably includes sideplates 90 and 91, a top plate 93, a bottom plate 94, and a depending guide plate 95. The plates 93, 94, and 95, are each provided with openings 97 for guiding the strands. It is desirable to have a plurality of individually tensioned strands mounted in juxtaposition for filament winding about the mandrel B, and I have thus provided individually rotatable roller means 100 and 101 for effecting strand tension.

Figures 8, 9, 10, 11:
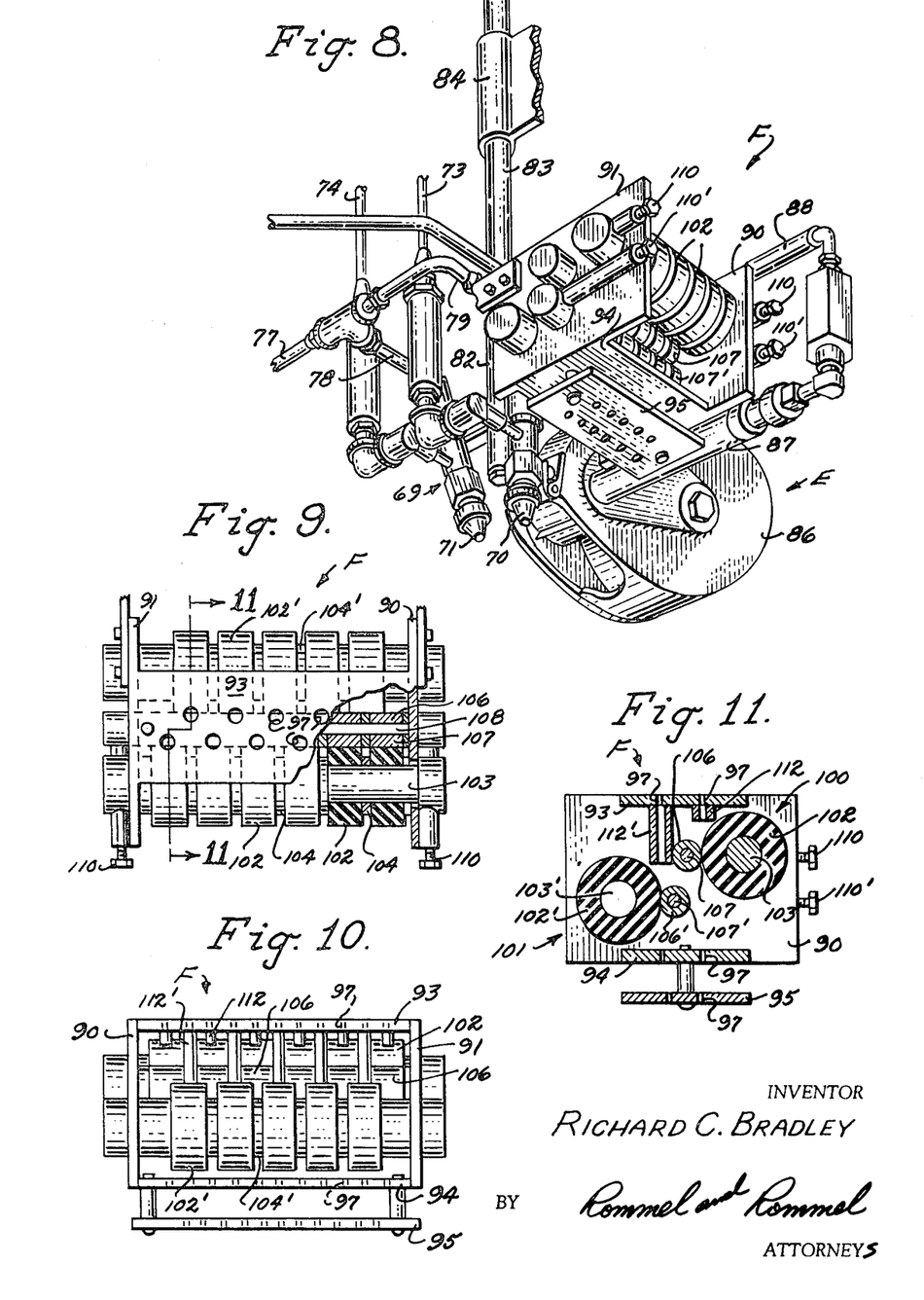
FIG. 8 is an enlarged perspective view of the spray depositing and strand tensioning apparatus of my invention.
FIG. 9 is an enlarged sectional view taken substantially on the line 9—9 of FIG. 1.
FIG. 10 is a rear view of the apparatus of FIG. 9.
FIG. 11 is a transverse sectional view taken substantially on the line 11—11 of FIG. 9.
Figure 12:
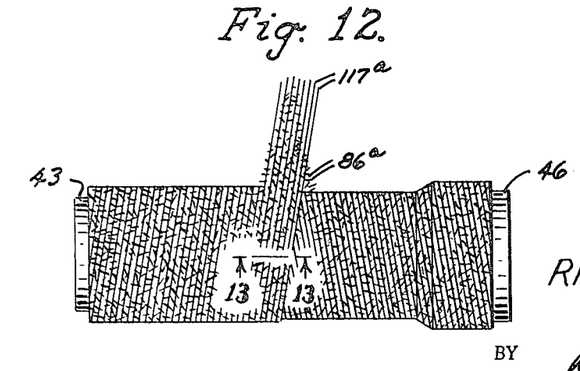
FIG. 12 is a somewhat diagrammatic view illustrating filament winding of a tubular article.

The roller means 100 acts upon the strands fed through the lower openings, as shown in FIG. 9, the same including rubber wheels 102 mounted upon shaft 103, spacers 104 being provided for maintaining the wheels 102 in spaced-apart position. The rubber wheels 102 engage metallic rollers 106, each of which are individually rotatably mounted on shaft 107 and maintained in a spaced-apart position by spacers 108. The rubber wheels 102 are maintained in proper compression upon the rollers 106 by the tension screws 110. By operation of the screws 110, the rubber wheels 102 can be compressed to a greater or lesser extent upon the rollers 106, the greater the compression the more the resistance of these wheels to rotation in accordance with the pull of the strand, thereby providing increased strand tension, and vice versa. A cylinder 112 depends below the openings 97 leading to the roller means 100, the sleeve 112 terminating just short of the roller 102, so that the strand fed through the opening 97 intercommunicates with the sleeve 112 will be guided into its proper strand tensioning position.

The roller means 101 is identical to the roller means 100, and like reference numerals with a prime character have therefore been applied thereto.

Strand carriage means G preferably includes a body portion 115 having wheels 116 which are received within and ride along the track 24$^a$ of frame A. The body portion 115 may be provided with appropriate spindles (not shown) for holding spools 117 of roving strands 117$^a$, and sheaves 118 may be provided for guiding the strands to the strand tension means F. The carriage means G is freely movable longitudinally along the track 24$^a$ of frame A, the same being moved by the carriage drive means H.

Carriage drive means H preferably includes a drive motor 120 mounted upon the frame A, which drive motor 120 has a shaft 121 which is interconnected to and drives a sprocket 125. An idler sprocket 126 is mounted in a spaced-apart position from the drive motor 120 on the frame A. A roller chain 127 is entrained about the sprockets 125 and 126. A depending bar 128, having a slot 129 therein is mounted upon the body 115, the slot 129 receiving a lug 130 mounted upon roller chain 127. As the roller chain rotates about the sprockets 125 and 126, the lug 130 will move therewith, pulling the shaft 128. Inasmuch as the shaft 128 is rigidly secured to the body 115, the movement thereof will move the strand carriage means G.

As shown in the drawings, the strand carriage drive means H is preferably located to one side of the point at which the strands are fed into the strand tension means F, so that catching of the strands is avoided. In the confined spaces of the drawing, the carriage drive means is, as a matter of fact, located closer to the strand tension means F than is preferred, the preferred construction being to position the drive means far enough to one side to completely avoid any overlap of the carriage drive with the strand tension means.

The motor 120 is preferably hydraulically driven, and interconnected with the motor 55 driving the mandrel B, for cooperative drive relationship.

Compacting and arranging means I preferably includes roller means 130 comprising an elongated roller 131 which extends for the length of mandrel B and is axially parallel thereto. The roller 131 is preferably provided with a continuous spiral thread 135 throughout its entire length, and I have found that eight threads per inch along the roller 135 is optimum design, providing a roller that acts upon the plastic composition deposited upon the mandrel B in such a manner as to squeeze out any air bubbles that may be entrapped therein and will serve to arrange any aggregate or fibers deposited within the plastic composition. The continuous spiral construction of the threads 135 prevents permanent grooving of the plastic composition engaged thereby. In the event that a pure plastic composition, without aggregate or filaments is to be provided upon the mandrel B, the roller 131 may be smooth. The roller 131 is mounted upon a shaft 136 which is rotatably supported upon the bracket means 137. The bracket means 137 is preferably pivotally mounted upon the frame A by pivot means 138, and includes an arcuate supporting shaft 139 so that a compensating balanced effect is obtained whereby the weight of the roller 131 is disposed toward the mandrel B, when in compacting and arranging position.

Figure 1:
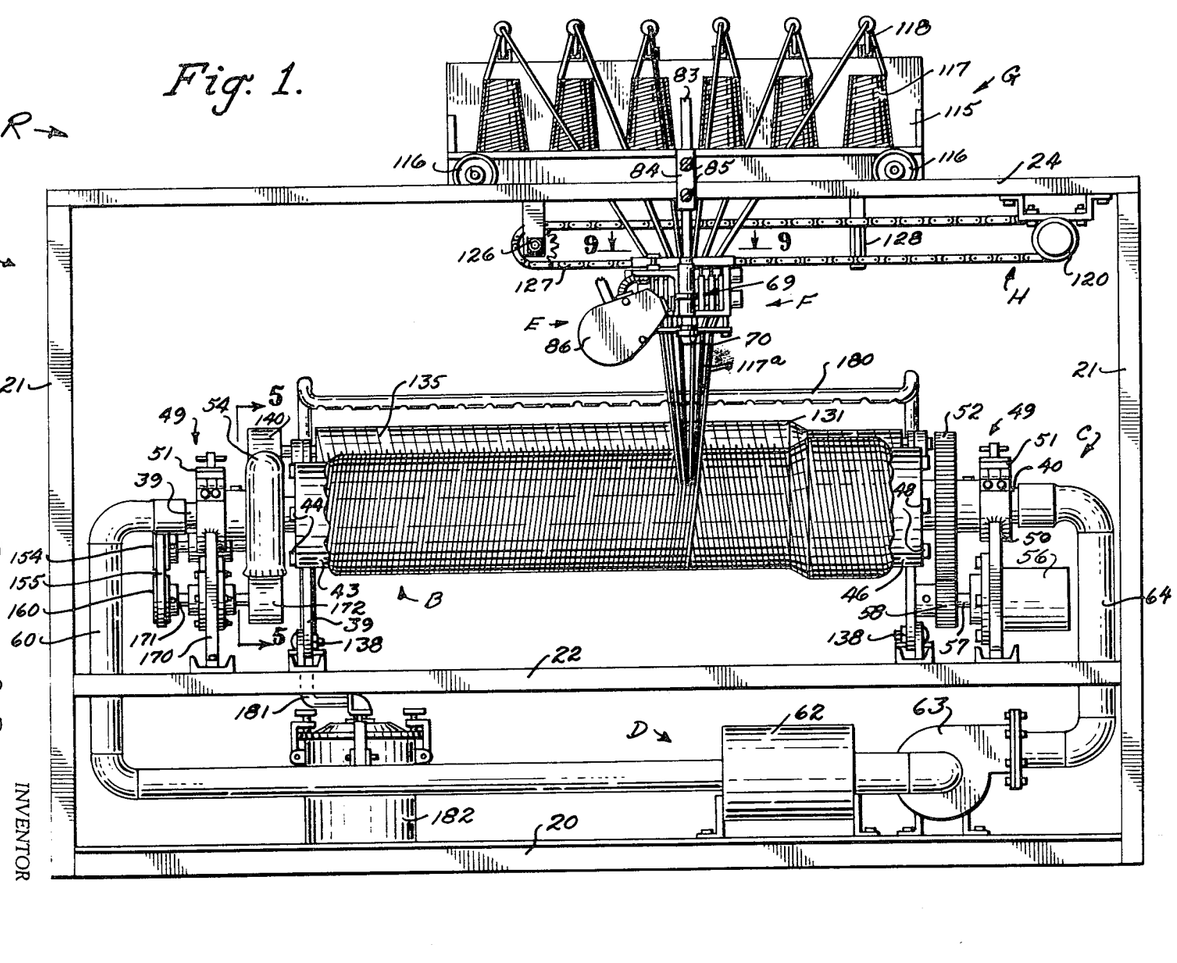
FIG. 1 is a front view of my improved apparatus.
Figure 2:
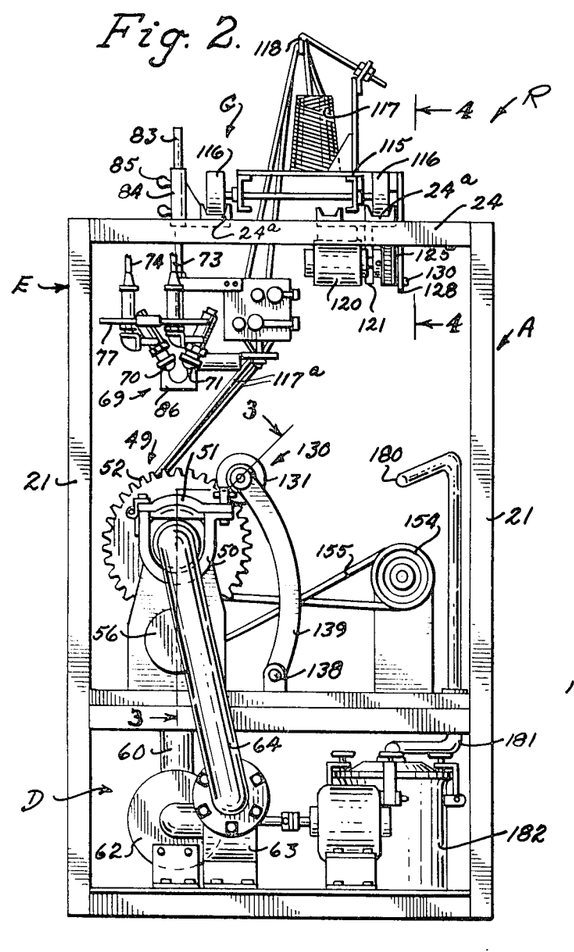
FIG. 2 is a side view taken from the right-hand side of FIG. 1.
Figure 3:
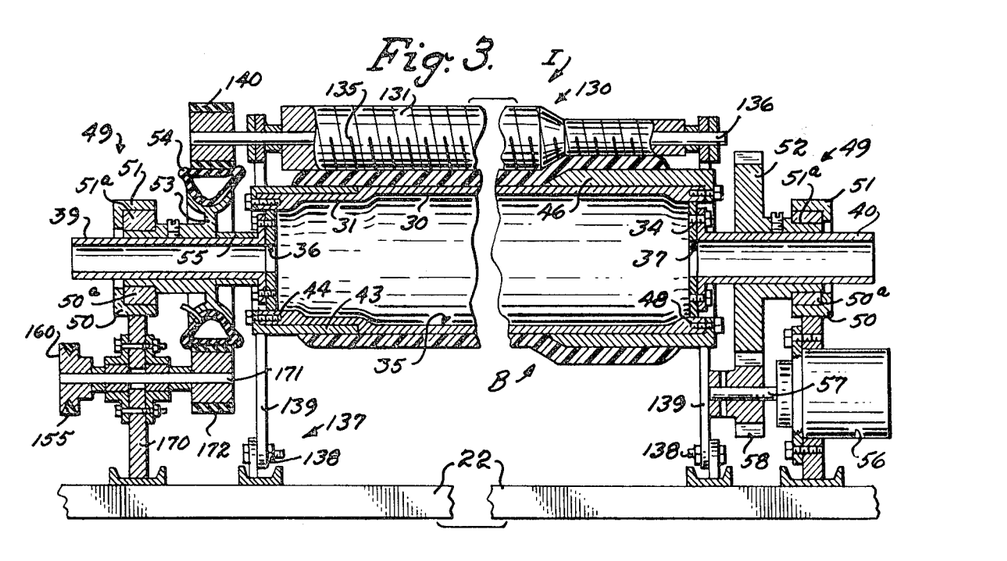
FIG. 3 is an enlarged transverse sectional view taken substantially on the line 3—3 of FIG. 2.
Figure 4:
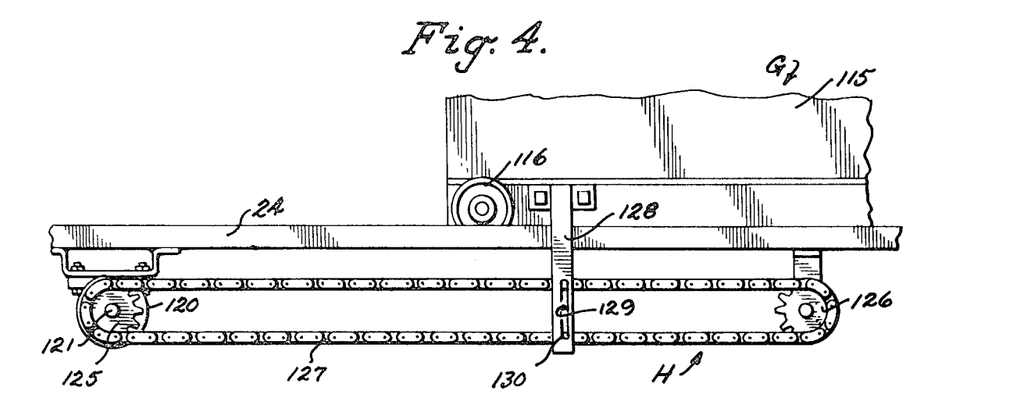
FIG. 4 is an enlarged fragmentary sectional view taken substantially on the line 4—4 of FIG. 2.
Figure 5:
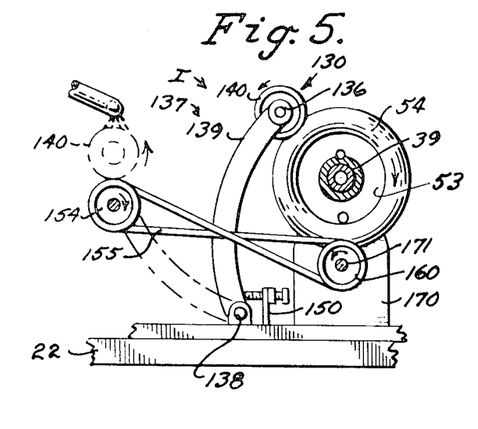
FIG. 5 is a somewhat diagrammatic side view taken substantially on the line 5—5 of FIG. 1.
Figure 6:
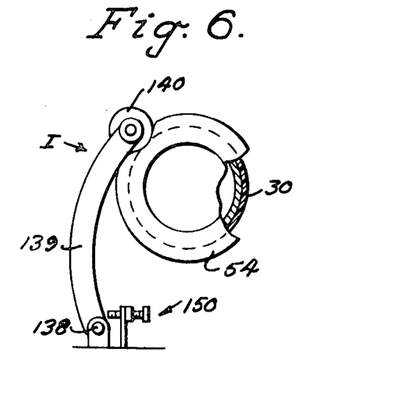
FIGS. 6 and 7 are diagrammatic views similar to FIG. 5 illustrating the drive relationship between the mandrel and the compacting and arranging roller.
Figure 7:
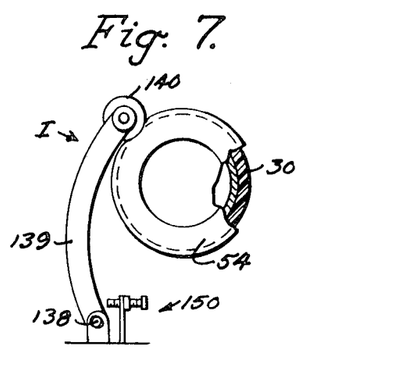

The shaft 136 is provided, at one end thereof, with a roller 140 which is in juxtaposition for abutment against the tire 54. The weight of the compacting and arranging means I being disposed toward the mandrel B, the roller 140 will be pressed into engagement with the tire 54. The tire 54 is inflated to a degree whereby sufficient frictional contact is provided between the roller 140 and the tire 54. As the plastic composition builds up upon the mandrel B, as shown in FIGS. 6 and 7, the roller 131 will ride along the outer surface of the deposited plastic composition, and the tire 54 will, due to the inflation thereof, remain in contact with the roller 140.

Stop means 150 is mounted in juxtaposition with respect to the shaft 139 of the compacting and arranging means I, so that the roller 131 may be spaced apart from the mandrel B at the beginning of the spray-depositing operation, so that a substantial thickness of the plastic composition may be permitted to be built up along the mandrel B prior to contact therewith of the roller 131. If this were not the case, the roller 131 would have a tendency to wipe the mandrel B clean. This is particularly true in the case of the depositing of a pure resin spray deposit. When filament is utilized, however, the tendency of the roller 131 to wipe the mandrel clean is less, so that the stop can be adjusted to provide virtually instantaneous contact with the mandrel B.

Inasmuch as the plastic composition deposited upon the mandrel B is in a substantially fluid condition, it is necessary to rotate the roller 131 at substantially the same surface speed of rotation as the mandrel B, and this is effected by means of the contact of the roller 140 with the tire 54.

When the tubular article has been formed, and the roller 131 moved away from the mandrel B, it is desirable to provide some means whereby any plastic composition which may have adhered to the roller 131 may be removed. I have therefore provided an idler roller 154 mounted upon the frame A, in juxtaposition for abutment against the roller 140 when the roll 131 is in its rearmost position. This roller 154 is arranged to rotate in abutment with the roller 140 so that the roller 131 is rotated in the same direction as it would be rotating when in contact with the tire 54. This is a further safeguard in avoiding wiping action of the roller 131 with respect to mandrel B and also avoids frictional loss. Roller 154 is driven by means of a belt 155 which is entrained about a sheave 160 mounted upon a shaft 171 rotatably carried by bracket 170. To shaft 171 is attached a roller 172 which is in constant abutment with and rotated by tire 54.

In order to provide for the cleaning of the roller 130, I have provided a perforated tube 180, extending the entire length of roller 131, which tube 180 intercommunicates with a hose 181 leading to a tank 182, through which appropriate solvents may be stored and ejected into the tube 180, for washing the roller 131.

In operation, the motors 56 and 120 are actuated, causing rotation of the mandrel B and movement of the carriage means G along the track 24, and the blower 63 and heater 62 are actuated, whereby hot fluid is passed through the mandrel B, causing the same to expand. Some form of release agent is then preferably sprayed or wiped on by hand upon the mandrel B, either through the gun 69 or by a separate gun. I have found that in use of the apparatus for making pipes of synthetic resin, that film forming type polyvinyl alcohol provides an excellent release agent. The polyvinyl alcohol cures almost instantaneously upon hitting the hot mandrel, peels away from the finished article, and is water soluble for facile removal of any residue. A layer 184 of polyvinyl alcohol is therefore provided upon the mandrel B, the same being very thin, usually less than a thousandths of an inch thick. A paste wax, applied by a cloth might also be used.

In the use of the apparatus for making pipes of polyester resin, a "gel coat" polyester resin coating 185 may be sprayed upon the polyvinyl alcohol. This provides a coating for the interior of the pipe, sealing the same so that there will be no "weeping." Various other plastic compositions, which are resistant to materials which may be desired to be conducted through a pipe formed upon the mandrel B, may be spray deposited upon the polyvinyl alcohol coating. This interior film for the pipe may be very thin, usually from ten-to thirty-thousandths of an inch thick. It is preferably air inhibited, so that it remains tacky and will bond itself completely to the resin utilized to form the main body of the tubular article. It has been a problem, in previously provided laminated pipe, to prevent the same from "weeping" or "osmosis" of the fluids contained within the pipe.

The apparatus is then in preparation for receiving the main body of the tubular article to be formed upon the mandrel B. If such article is to be filament wound, one end of the strands 117ª are preferably initially attached to the mandrel B, such as by a small piece of adhesive tape, masking tape, or the like, so that such strands will be pulled, by rotation of the mandrel B, through the strand-tensioning means F, and be wound about the pipe, as the carriage G moves along the track 24. After the strands have thus been attached to the mandrel, the gun 69 is actuated, spray depositing chopped roving 86ª and a catalyzed resin and a promoted resin upon the strands and the mandrel B. It is to be noted particularly that with the use of my apparatus it is not necessary to prewet the strands, which has been the previously required practice in making any form of filament wound tubular articles. The provision of the overhead spray depositing of the resin and the fibers holds fallout of the fibers and resin to a minimum, reducing unwanted atomization and fumes. The tension of the strands will pull the same into the resin 186 which has been spray deposited upon the mandrel B. As a matter of fact, the compacting and arranging roller 131 is not required to be utilized when the apparatus is used for the making of filament wound tubular articles, inasmuch as the tension upon the filaments will compact the resin 186 deposited upon the mandrel B. In the making of the tubular articles utilizing filament strands, resins, and the chopped roving will be distributed in a jack straw fashion throughout the resin, bonding the filaments together, as shown in FIG. 13. In previously provided apparatus for filament wound tubular articles, the same has been unable to sustain any axial stress which would cause separation of the filaments. The chopped roving serves to bond the filaments together.

It is, of course, to be understood that is is not absolutely necessary to utilize either the filaments or the chopped roving in the making of tubular articles upon my apparatus. If desired, the filaments may be omitted, so that a tubular article composed merely of resin and chopped roving may be provided; the chopped roving may be omitted, providing a tubular article composed of filament strand and resin; or both the filament strand and the chopped roving may be omitted, providing a pure resin tubular article.

During the course of the coating of the mandrel B with the plastic composition, the hot fluid will be continuously circulated through the chamber 35, thereby maintaining the mandrel B in an expanded condition.

After the desired thickness of resin has been spray deposited upon the mandrel B, the strands 117$^a$ will be cut from the strand-tensioning means F, and the loose ends compressed into the deposited plastic composition, either by means of a hand-held roller or by the roller 131, if it is used, and the spray-depositing operation is stopped. The roller 131 is then moved to its position as shown in dot-and-dash lines in FIG. 5, and the solvent sprayed thereupon, to remove any unwanted accumulation of resin therefrom.

The blower 63 is disconnected from the heater 62, and a cool fluid is circulated through the chamber 35. Circulation of the cooling fluid causes contraction of the mandrel B so that the tubular article formed thereupon may be removed.

A coating 187 may be applied exteriorly of the tubular article as a finish. Such coating may be another layer of "gel coat." This exterior layer may contain a colored pigment when the article formed is to be used in such a manner as to be seen.

Insofar as dismantling of the mandrel B for removal of the tubular article formed thereupon is concerned, sleeves 43 and 36 are first preferably removed. It will be noted that the sleeve 46 forms an expanded portion of the tubular article, so that in the event that the apparatus is utilized for the making of pipe, a bell-shaped end is provided at one end of the pipe, within which the opposite ends of the next section of pipe may be inserted and fixed in position.

In some instances it may be desired to trim the ends of the pipe while it is still upon the mandrel B. For this purpose I have provided a removable sleeve 46 and fillet 43. Upon removal of the sleeve 46 and fillet 43, it will be noted that a space is provided at the ends of the article which require trimming, between the tubular article formed upon the machine and the mandrel B, so that any cutting tool utilized to trim that end of the pipe will not likely come in contact with the mandrel B, thereby scarring the same.

Form S of the invention relates mainly to a modified form of carrier for the apparatus which deposits material on the mandrel. It may thus be mounted on such as a frame A of form R which carries various other parts of apparatus similar to that of R, such as mandrel drive means C, mandrel heating and cooling means D, strand carriage means G, strand carriage drive means H, and means I for compacting material deposited upon the mandrel B.

Modified form S preferably includes a main support frame 200 on which may be mounted strand guide means 201, strand-tensioning means 202, and a traversing mount 203 which may support means 204 for spray depositing cut roving means 205 for depositing a promoted resin and means 206 for depositing a catalyst.

Main support frame 200 may include a substantially vertical shaft portion 210 which may be received, for instance, within sleeve 84 mounted upon carriage supporting portion 24 of frame A, such as by set screws 85, for reciprocable motion along the length of carriage supporting portion 24 of frame A, as previously described in connection with form R of the invention.

It should of course, be understood that recitation of a carriage means for reciprocable movement of the material-depositing apparatus along the length of mandrel B is not to be construed as limiting the same to the wheeled doely arrangement as shown in form R, but any other suitable reciprocable drive means may be used.

Adjacent the lowermost portion of shaft 210 there is attached a bracket member 211, to one side of which may be attached depending plate members 212 for support of strand guide means 201 and strand-tensioning means 202.

Strand guide means 201 preferably comprises spaced-apart guide plates 214 having a plurality of vertical openings 215 therethrough which act as a form of comb-guide for filament strands 117$^a$.

Strand guide means 201 may be mounted intermediate spaced apart strand guide plates 214, and may comprise a plurality of strand tension means 220, about which are entrained filament strands 117$^a$, as clearly shown in FIG. 15. Strand tension means 220 preferably comprise fixed rods, the frictional engagement thereof with the strands acting to apply tension to strands 117$^a$ for the same purposes as has been previously described in connection with strand tension means F of form R.

Bracket 211 preferably includes an elongated trackway 222 for supporting traversing mount 203. Traversing mount 203 preferably includes an elongated slideplate 230 slidably mounted within trackway 222 of bracket 211, the same being extendant through and outwardly from each end of trackway 222, being provided with bumper members 231 and 232 at respective opposite ends thereof. Plate 230 is mounted within trackway 222 for reciprocable movement parallel to the line of traverse of main support frame 200. A tension spring member 235 may be mounted on bracket 211, for abutment against plate 230, the pressure thereof on plate 230 being adjustable by setscrew member 236.

In the formation of plastic pipe according to my invention, it is desirable that the spraying of the promoted resin and catalyst precede the wrapping about the mandrel of the continuous strands of roving. Thus, as the traverse of the material-depositing apparatus is toward the right-hand end of the mandrel, the resin depositing apparatus is preferably disposed to the right-hand side of the strand-applying apparatus. Conversely, when the direction of travel of the material depositing apparatus is toward the left-hand end of the mandrel, the resin depositing apparatus is preferably disposed to the left-hand side of the strand-applying apparatus. It is thus obvious that some means must be provided for shifting the resin depositing apparatus to the appropriate side of the apparatus which deposits the continuous strands. This is the purpose of traversing mount 203.

As shown in FIG. 14, in full lines, the apparatus is disposed for movement toward the right hand end of the mandrel. A butt plate member 237 is mounted on such as right-hand side portion 21 of frame A. As main support frame 200 approaches the end of mandrel B, bumper 231 of traversing support 203 will abut against butt plate 237, and continued movement of main support frame 200 toward the right hand end of mandrel B will cause traversing support 203 and the members thereon to be shifted to the left hand side of the apparatus for applying the continuous strands, as shown in dot-and-dash lines in FIG. 14. Such apparatus will then be appropriately positioned for movement toward the left-hand end of mandrel B. A corresponding butt plate (not shown) may be mounted on left hand side portion 21 of frame A for abutting bumper 232 in shifting traversing mount 203 to the right-hand side of the strand-depositing apparatus for movement of main support frame 200 to the right.

Depending from plate 230, substantially centrally thereof may be a pair of parallel plate supports 240 and means 204 for spray depositing cut roving may be attached adjacent one side of plate 230, as shown in FIG. 15. Means 204 may be identical to chopper 86 as previously described in connection with form R of the invention.

Means 205 may comprise any conventional form of nozzle applying a promoted resin. It preferably includes a dispensing head 244, as shown in FIG. 16 for spray depositing promoted resin in a substantially solid spray stream form in the nature of discharge of a water pistol through openings 245 thereof and onto mandrel B.

Means 206 may be of any conventional type for applying a catalyst fog in catalyzing the resin as it is applied about mandrel B. If may, for instance, comprise a catalyst nozzle such as set forth in my copending application Ser. No. 245,376, filed Feb. 17, 1964 now U.S. Pat. No. 3,161,515.

It is desirable that the dispensing applicator means 205 and 206 be cut off as the apparatus reaches the end of travel toward each end of mandrel B. If the same were not cut off, catalyzed and promoted resin would be deposited over each end of mandrel B, and it would be impossible to slip the pipe off of the mandrel without first cutting off either one or the other of the ends thereof. Accordingly, the conduits (not shown) leading to the respective dispensing applicator means 205 and 206 are provided with suitable valve means (not shown) of conventional construction, which may be actuated by limit switch means 250.

Adjacent each end of frame A, only the right hand one thereof being shown in FIG. 14, is provided a cam means 251 which abuts against roller 252 of limit switch means 250 as main support frame 200 approaches an end of mandrel B. A pivoted bar member 253 forms a part of cam member 251, and, as limit roller 252 moves into abutment therewith, the same will gradually apply pressure to roller 252, activating the valve (not shown) for causing a gradual decrease in supply of promoted resin and catalyst, until the same is fully turned off, as shown in dotted lines at the upper portion of FIG. 14. There will also be supplied a cam means 251 (not shown) for cooperation with limit switch means 250 adjacent the left hand end of mandrel B, as may be easily appreciated.

Figure 17:
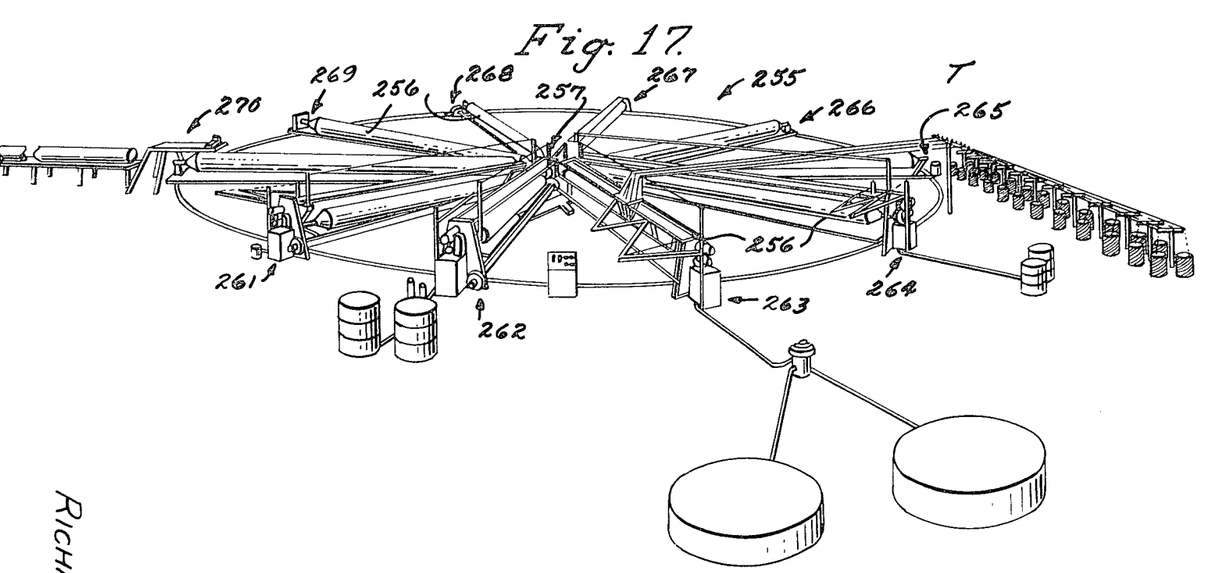
FIG. 17 is a somewhat schematic diagram showing the relationship of parts which may be used for continuous production of tubular articles.

As shown in FIG. 17, the previously described apparatus may be mounted on a rotating frame 255 so that pipe may be continuously produced. Frame 255 preferably includes a plurality of mandrel supports 256 mounted in the nature of spokes for revolving about a central axis 257 on a track 258 through a sequence of steps as follows:

Application of release agent at station 261; an interior gel coat applied at station 262; the laminate of resin, catalyst, and where desired, continuous strands and cut roving applied at station 263; an exterior gel coat being applied at station 264; curing at 265; annealing at station 266; further annealing and trimming the ends at station 267; cooling the mandrel at station 268; shrinking the mandrel at station 269; and ejection of the completed pipe from the mandrel at station 270.

Various changes in the shape, size and arrangement of the parts may be made to the forms of the invention herein shown and described without departing from the spirit of the invention or the scope of the following claims.

I claim:

1. In apparatus for forming tubular articles, the combination of a frame, a mandrel, means for rotatably supporting said mandrel upon said frame, material-depositing means, carriage means movably mounted upon said frame, attaching means for securing said material-depositing means upon said carriage means for movement thereof longitudinally of said mandrel and in juxtaposition for depositing material upon said mandrel, roller means rotatably mounted upon said frame in juxtaposition with respect to said mandrel for selective engagement with material deposited on said mandrel in compacting and arranging the material deposited upon said mandrel, drive means operatively connected to said mandrel for the rotation thereof and operatively connected to said carriage means for the cooperative longitudinal movement of said carriage means in relation to the rotation of said mandrel, and means operatively interconnecting said mandrel and said roller means for rotating said roller means at the same surface speed of rotation as the outside diameter of the tubular article as it is formed on said mandrel, said last-mentioned means being operable independently of engagement of said roller with material deposited on said mandrel.

2. The combination as specified in claim 1 wherein said mandrel is of a material having a predetermined coefficient of expansion and retraction under the respective application of heated and cooled fluids thereto, said mandrel comprising a cylinder having a chamber therewithin for receiving heated and cooled fluids, conduits secured to said cylinder and leading into said chamber, said conduits providing passageways for the egress and ingress of fluid to within and through said chamber, said conduits being secured to said cylinder in juxtaposition so that the fluid at the desired temperature may be continuously passed through said chamber during the rotation of said mandrel.

3. The combination as specified in claim 1 wherein said frame includes track means and said carriage means includes wheel means rotatably engaging said track means for guiding said material-depositing means longitudinally of said mandrel, said attaching means including a bracket for supporting said material-depositing means, said bracket being movable with respect to said carriage means in a direction transversely to the longitudinal axis of said mandrel for positioning said material-depositing means in a predetermined spaced relationship with respect to said mandrel, and said drive means includes a drive sprocket mounted upon said frame adjacent one end of said track means, idler sprocket means spaced apart from said drive sprocket, an endless flexible carrier entrained about said sprockets, a power source mounted upon said frame and operatively connected to said drive sprocket, lug means secured to said endless flexible carrier, a drive plate secured to said carriage means, said drive plate having a slot provided therein within which is slidably received said lug means, said lug means being slidable within said slot transversely to the direction of movement of said endless flexible carrier to provide for movement of said lug along said slot as said lug moves about said sprockets, said lug being in abutment with said drive plate longitudinally of the direction of movement of said endless flexible carrier for moving said carriage means longitudinally between said sprockets.

4. The combination as specified in claim 1 wherein said roller means includes a longitudinally extending roller substantially the same length as said mandrel, bracket means rotatably supporting said roller parallel to said mandrel, pivot means supporting said bracket means upon said frame for pivotal movement of said roller in a direction transversely to the longitudinal axis of said mandrel, and stop means operatively engaging said bracket means for supporting said roller in a spaced apart position from said mandrel so that a predetermined thickness of material may be required to be deposited upon said mandrel prior to engagement of said roller therewith.

5. The combination as specified in claim 1 wherein said last-mentioned means includes compensator means for maintaining the surface rate of rotation of said roller and the outside diameter of the tubular article as it is being formed on said mandrel the same during the compacting and arranging cycle of said roller means.

6. The combination as specified in claim 1 wherein said roller means includes a longitudinally extending roller substantially the same length as said mandrel, bracket means rotatably supporting said roller parallel to said mandrel, pivot means supporting said bracket means upon said frame for pivotal movement of said roller in a direction transversely to the longitudinal axis of said mandrel, and limit means mounted upon said bracket means for regulating maximum pivotal movement of said roller in a direction away from said mandrel, said limit means including switch means for deactivating said drive means when the desired maximum pivotal movement has been attained.

7. The combination as specified in claim 1 wherein said last-mentioned means comprises expansible means attached to and rotating with said means for rotatably supporting said mandrel upon said frame, and said roller means includes a drive sheave of the same outer diameter as said roller means, said drive sheave of said roller means being in abutment with said expansible means when said roller means is in compacting and arranging position and said expansible means being expansible as material is built up about said mandrel, whereby said roller means is caused to have the same surface speed of rotation as the surface speed of rotation of the material built up on said mandrel.

8. The combination as specified in claim 1 wherein said last-mentioned means includes means for rotating said roller means at the same surface speed of rotation as said mandrel when said roller means is in compacting and arranging position, and means for rotating said roller means for cleaning purposes when said roller means is retracted from compacting and arranging position.

9. The combination as specified in claim 1 wherein means for cleaning said roller means is mounted upon said frame, said means including means for the application of a cleaner to said roller means and means for bringing the compacting and arranging surfaces of said roller means into juxtaposition for application of the cleaner.

10. In apparatus for forming tubular articles, the combination of a frame, a mandrel rotatably mounted on said frame, said mandrel defining a form for the tubular article and having a main body portion and removable portions, said removable portions being in juxtaposition with respect to said main body portion whereupon the removal of said removable portions said tubular article formed upon said mandrel will be supported by said main body portion and the portions of the tubular article formed adjacent said removable portions will be spaced apart from said mandrel, and means for the depositing of material and formation of a tubular article about said mandrel.

11. In apparatus for forming tubular articles, the combination of a frame; an elongated mandrel rotatably mounted on said frame, said mandrel including a main body portion having a predetermined outer diameter, a first removable end portion having an outer diameter coextensive with the outer diameter of said main body portion, and a second removable end portion at the opposite end of said mandrel from said first end portion, said second end portion having an outer diameter greater than the outer diameter of said main body portion, said removable end portions defining a portion of the form for the tubular article and being juxtaposed with respect to said main body portion whereupon the portion of the tubular article formed by said first end portion will have an inner diameter coextensive with the diameter of the tubular article formed by said main body portion, and the portion of the tubular article formed by said second end portion will have an inner diameter greater than the inner diameter of the tubular article formed by said main body portion, said end portions being removably positioned with respect to the main body portion whereby upon removal of said end portions the tubular article formed upon said mandrel will be supported by said main body portion and the portions of the tubular article formed adjacent said end portions will be spaced apart from said mandrel, and means for the depositing of material and formation of a tubular article about said mandrel.

12. In apparatus for forming hollow articles, the combination of a frame, a mandrel rotatably mounted upon said frame, means for winding strand means about said mandrel in a generally helical fashion, means for depositing chopped roving in a jackstraw fashion upon said mandrel, said second mentioned means being mounted in juxtaposition with respect to said first mentioned means so that said chopped roving is deposited upon said mandrel in an intermingled relationship with the strand means and means for depositing a binder upon said mandrel, said third-mentioned means being mounted in juxtaposition with respect to said first and second-mentioned means so that the binder is applied to the strand means prior to the winding thereof about said mandrel, and said binder is applied to the chopped roving prior to depositing thereof on said mandrel.

13. In apparatus for forming hollow articles, the combination of a frame, a mandrel rotatably mounted upon said frame, means mounted upon said frame for winding strand means about said mandrel in a generally helical fashion, means for cutting roving into short lengths and feeding such short lengths of roving for deposit of the same in a jackstraw fashion upon said mandrel in an intermingled relationship with the strand means, and means for depositing a binder upon the mandrel concurrently with the depositing of the strand means and the short lengths of roving.

14. In apparatus for forming hollow articles, the combination of a frame; a mandrel rotatably mounted on said frame; carriage means mounted upon said frame; strand means mounted upon said carriage means in juxtaposition for winding about said mandrel; strand tension means mounted upon said carriage means for maintaining said strand means under a predetermined tension, said strand tension means including a first set of roller means, and a second set of roller means, said first set of roller means abutting against said second set of roller means at a predetermined pressure; means for spray depositing a binder upon said strand means prior to the winding thereof about said mandrel and upon said mandrel; and drive means for said carriage means whereby said carriage means is moved longitudinally of said mandrel in a predetermined relationship with respect to the speed of rotation of said mandrel.

15. In apparatus for forming hollow articles, the combination of a frame, a mandrel rotatably mounted on said frame, said mandrel being of a material having a predetermined coefficient of expansion and retraction under the respective application of heated and cooled fluids thereto, said mandrel comprising a cylinder comprising a chamber therein for receiving heated and cooled fluids, conduits secured to said cylinder and leading into said cylinder, said conduits providing passageways for the egress and ingress of fluid to within and through said chamber, said conduits being secured to said cylinder in juxtaposition so that the fluid at the desired temperature may be continuously passed through said chamber during the rotation of said mandrel; carriage means mounted upon said frame; strand means mounted upon said carriage means in juxtaposition for winding about said mandrel; strand tension means mounted upon said carriage means for maintaining said strand means under a predetermined tension; means for spray depositing binder upon said strand means prior to the winding thereof about said mandrel and upon said mandrel; and drive means for said carriage means whereby said carriage means is moved longitudinally of said mandrel in a predetermined relationship in respect to the speed of rotation of said mandrel.